United States Patent
Gao et al.

(10) Patent No.: US 8,416,191 B2
(45) Date of Patent: Apr. 9, 2013

(54) LARGE DEPTH OF FIELD NAVIGATION INPUT DEVICES AND METHODS

(75) Inventors: Jung Gao, Saratoga, CA (US); Omid Momtahan, San Jose, CA (US); Michael John Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 845 days.

(21) Appl. No.: 12/570,915

(22) Filed: Sep. 30, 2009

(65) Prior Publication Data

US 2011/0074676 A1    Mar. 31, 2011

(51) Int. Cl.
G06F 3/033    (2006.01)
(52) U.S. Cl. ........ 345/166; 345/157; 345/158; 345/163; 178/18.09; 178/18.11
(58) Field of Classification Search .................. 345/157, 345/158, 163, 166; 178/18.09, 18.11
See application file for complete search history.

(56) References Cited

U.S. PATENT DOCUMENTS

| | | | |
|---|---|---|---|
| 6,151,015 A | 11/2000 | Baydal et al. | |
| 6,476,970 B1 | 11/2002 | Smith | |
| 6,797,937 B2 | 9/2004 | Norskog et al. | |
| 2006/0045314 A1* | 3/2006 | Gao et al. | 382/106 |
| 2006/0176581 A1* | 8/2006 | Lu | 359/738 |
| 2007/0013661 A1* | 1/2007 | Theytaz et al. | 345/166 |
| 2007/0091067 A1* | 4/2007 | Elsheimer et al. | 345/157 |
| 2007/0164999 A1* | 7/2007 | Gruhlke | 345/166 |
| 2007/0246646 A1* | 10/2007 | Lum et al. | 250/231.13 |
| 2008/0244466 A1 | 10/2008 | Orsely | |
| 2009/0108175 A1 | 4/2009 | Grot | |
| 2009/0141000 A1 | 6/2009 | Krishnan et al. | |
| 2009/0159780 A1 | 6/2009 | Koay et al. | |
| 2009/0160773 A1* | 6/2009 | Bohn et al. | 345/166 |
| 2010/0282950 A1* | 11/2010 | Smith | 250/221 |

OTHER PUBLICATIONS

"Visual Touchpad: A Two-Handed Gestural Input Device," Malik et al., ICMI '04, Oct. 13-15, 2004, State College, PA; ACM 1-58113-890-4/04/0010.
"Displacement Sensing and Estimation Theory and Applications," Gao et al., Appl. Phys. A 80, 1265-1278, 2005.

* cited by examiner

Primary Examiner — Latanya Bibbins

(57) ABSTRACT

Disclosed are various embodiments of a navigation input device, and methods, systems and components corresponding thereto. According to some embodiments, the navigation input device has a large depth of field associated therewith and employs time- and/or frequency-domain processing algorithms and techniques. The device is capable of providing accurate and reliable information regarding the (X,Y) position of the device on a navigation surface as it is moved laterally thereatop and thereacross, notwithstanding changes in a vertical position of the device that occur during navigation and that do not exceed the depth of field of an imaging lens incorporated therein. According to one embodiment, the navigation input device is a writing instrument that does not require the use of an underlying touch screen, touch pad or active backplane to accurately and reliably record successive (X,Y) positions of the writing device as it is moved across and atop an underlying writing medium.

26 Claims, 8 Drawing Sheets

LARGE DEPTH OF FIELD NAVIGATION INPUT DEVICES AND METHODS

FIELD OF THE INVENTION

Various embodiments of the invention described herein relate to the field of navigation input devices such as optical mice, writing instruments, pens, styluses, measuring devices and machine alignment devices.

BACKGROUND

A broad array of hand-held navigation and input devices are known in the art, such as mice, pens and styluses. Such input devices operate in a number of fashions. For example, optical computer mice provide (X,Y) positions of the mice as they navigate atop and across navigation surfaces. Other input devices such as styluses and pens are often used in conjunction with capacitive touch screens, touch pads and other types of active backplanes or navigation surfaces to indicate the (X,Y) position of a stylus or pen as is moved across the navigation surface.

One notable shortcoming of many such input devices and systems is that they may be incapable of operating properly when lifted vertically from the navigation surface as they are moved laterally across the navigation surface. For example, when the vertical distance by which such an input device is lifted off the navigation surface exceeds tightly constrained design maxima exceeding say a millimeter or two, the ability to navigate and provide accurate (X,Y) positions to the computer or other device to which the device is operably linked is lost. Moreover, and in the case of some pens or styluses, rather complicated and expensive navigation substrates or surfaces such as specialized electronic writing surfaces, active backplanes, capacitive touch screens, and the electronic circuitry associated therewith, is required to provide and report the (X,Y) positions of the pen or stylus as it is moved across the navigation surface or substrate.

In the case of a pen-shaped optical mouse employed to record handwriting input by a user, changes in vertical spacing between the pen-shaped optical mouse and the navigation surface can wreak havoc in the ability to accurately record the (X,Y) movements and positions of the pen-shaped optical mouse as it is moved across and atop the navigation surface. These shortcomings are typically exacerbated when writing is done using Kanji, Hanzi, Arabic or other sets of writing characters owing to the complicated natures of the characters themselves, as well as errors introduced by vertical movements of the pen-shaped optical mouse. For example, problems in faithfully recording (X,Y) positions of a pen-shaped optical mouse may be introduced by way of the natural and frequent tendency of many users to lift the pen-shaped optical mouse from the writing medium as they write.

What is needed is a navigation input device capable of reliably and accurately reporting (X,Y) positions as the device is moved across a navigation surface notwithstanding vertical movements of the device that occur as the device is being moved. What is also needed is an input system that does not require the use of complicated and expensive navigation substrates such as active backplanes, touch screens, or touch pads.

SUMMARY

In one embodiment, there is provided a navigation input device comprising a light source configured to project an illumination light downwardly therefrom, an aperture located beneath the illumination lens and configured to permit at least a portion of the illumination light to pass therethrough for incidence upon a navigation surface located below the aperture, an imaging lens having a depth of field exceeding about 10 mm, the imaging lens being positioned and configured to receive at least a portion of upwardly reflected light formed by at least a portion of the illumination light being reflected from the navigation surface towards the imaging lens, the imaging lens being located a working distance above the navigation surface, a light detector comprising a sensor pixel array configured to receive at least a portion of the upwardly reflected light passing through the imaging lens and to convert such portion of the reflected light into imaging signals corresponding to individual pixels in the sensor pixel array, and a navigation processor configured to receive and process the imaging signals corresponding to successively acquired image frames of the sensor pixel array such that output data corresponding to (X,Y) positions of the device with respect to the navigation surface are provided thereby, and further such that the output data include compensation or adjustment for changes in the working distance caused by the device being lifted or lowered in respect of the navigation surface, the changes in the working distance falling within the depth of field of the imaging lens.

In another embodiment, there is provided a method of navigating across a navigation surface with a navigation input device comprising illuminating the navigation surface with at least a portion of illumination light generated by a light source, sensing reflected light resulting from at least a portion the illumination light being reflected from the navigation surface and passing through an imaging lens, the imaging lens having a depth of field exceeding about 10 mm and further being located a working distance above the navigation surface, the sensed reflected light being employed to generate imaging signals, generating, from the imaging signals, successive image frames corresponding to images of the reflected light as the device and the navigation surface move in respect of one another, and processing the successive image frames such that output data corresponding to (X,Y) positions of the device with respect to the navigation surface are provided thereby, and further such that the output data include compensation or adjustment for changes in the working distance caused by the device being lifted or lowered in respect of the navigation surface, the changes in the working distance falling within the depth of field of the imaging lens.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION OF SOME PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "up," "down," "upwardly," "downwardly," "front," back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the invention is defined by the appended claims.

Figure 1:
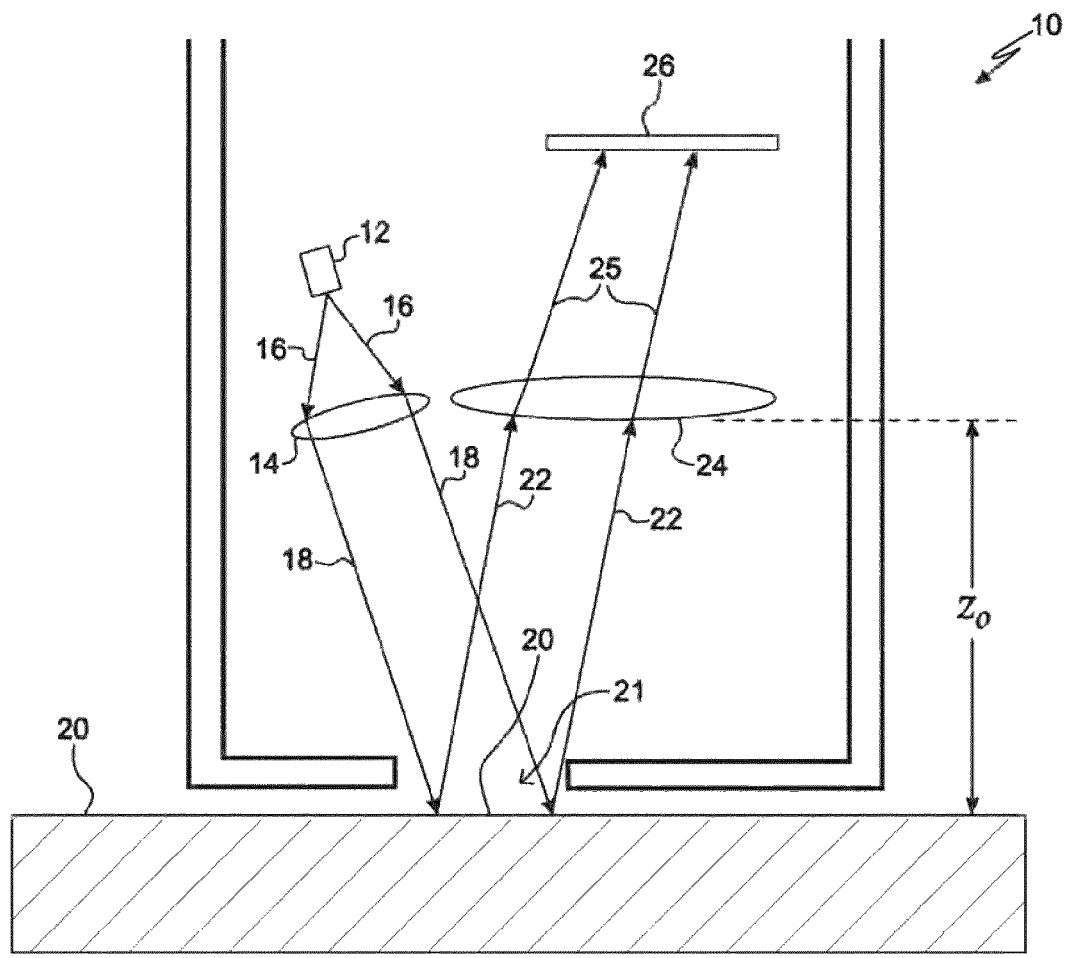
FIG. 1 shows a cross-sectional view of one embodiment of an optical portion of navigation input device 10.

Referring now to FIG. 1, there is shown one embodiment of navigation input device 10 configured for movement and navigation atop and across navigation surface 20. In one embodiment, device 10 is configured to be hand-held by a user. According to the embodiment shown in FIG. 1, navigation input device 10 comprises light source 12, illumination lens 14, aperture 21, imaging lens 24, and light detector 26. Light source 12 is configured to project illumination light 16 therefrom. Illumination lens 14 is configured to receive illumination light 16 and project such light downwardly therefrom as collimated light 18. Aperture 21 is located beneath illumination lens 14 and is configured to permit collimated light 18 to pass therethrough for incidence on navigation surface 20, from which light 18 is reflected upwardly as reflected light 22. Imaging lens 24 has a large depth of field exceeding or about 10 millimeters, about 12 millimeters, about 14 millimeters, about 16 millimeters, about 18 millimeters, or about 20 millimeters, and is positioned and configured to receive reflected light 22. Note that illumination lens 14 is optional. Note further that in one embodiment device 10 may be configured such that illumination light 16 and reflected light 22 are co-linear. One such implementation can be achieved by passing illumination light 16 through imaging lens 24. Beam splitting techniques known in the art of optical mice may be adapted for use in such an embodiment, as discussed in further detail below. In some embodiments, reflected light 22 forms a reflected light beam, specular reflections from navigation surface 20, or light scattered by navigation surface 20.

Figure 2:
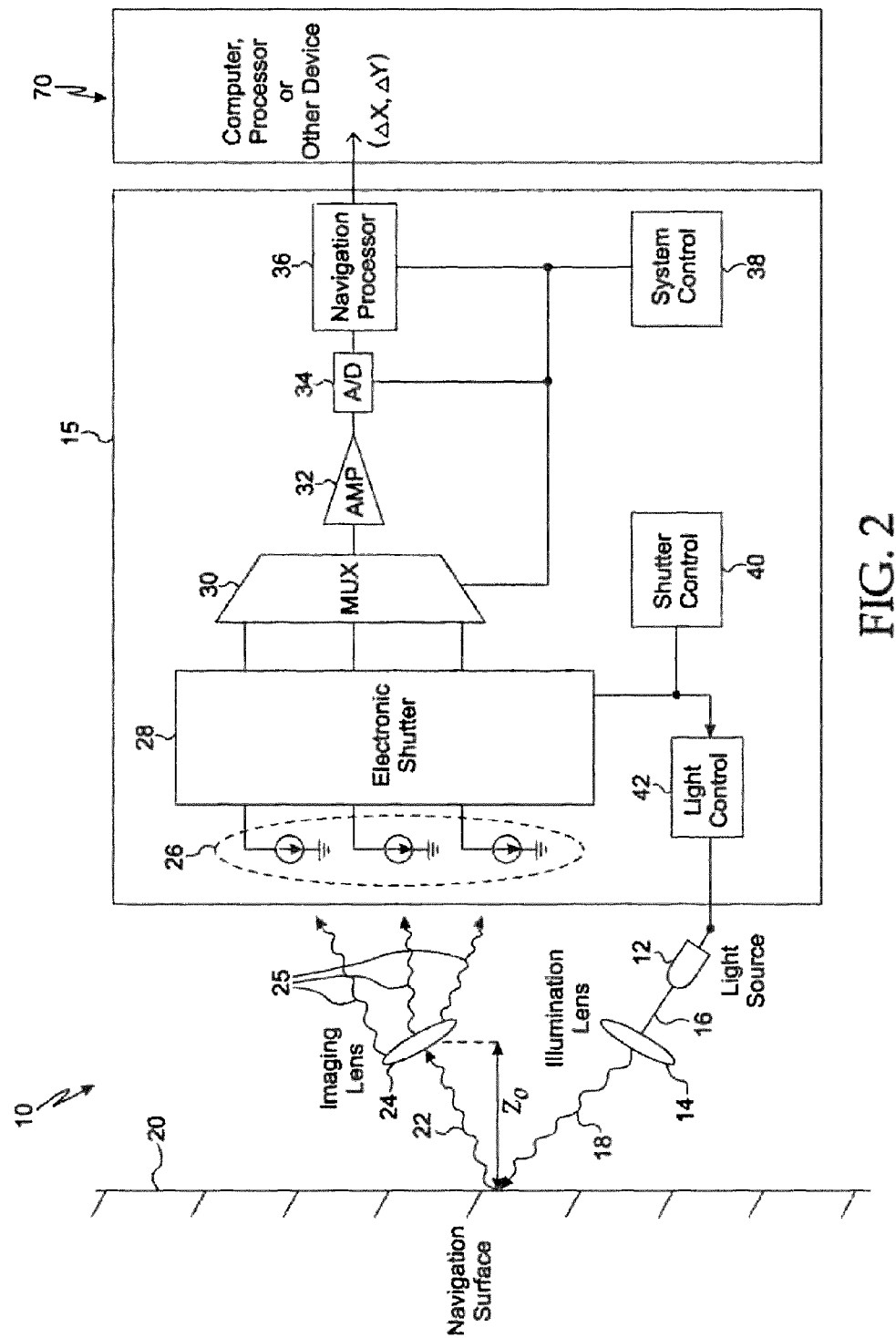
FIG. 2 shows one embodiment of a schematic block diagram of navigation input device 10 operably connected to computer, processor or other device 70.

Referring to FIGS. 1 and 2, and upon having passed through imaging lens 24, reflected light 22 becomes imaging light 25. Imaging light 25 is incident upon light detector 26, which according to one embodiment is a sensor pixel array configured to receive imaging light 25 thereon and convert imaging light 25 into imaging signals corresponding to individual pixels in the sensor pixel array. In one embodiment, navigation processor 36 is configured to receive and process multiplexed, amplified and analog-to-digital converted imaging signals corresponding to successively acquired image frames of sensor pixel array 26 such that variations in a vertical distance $z_0$ (or $\Delta z_0$) that occur between imaging lens 24 and navigation surface 20 as device 10 is lifted or lowered in respect of navigation surface 20 are compensated for or adjusted as navigation input device 10 is moved across navigation surface 20. Navigation processor 36 then outputs (X,Y) positions from device 10 as device 10 moves across navigation surface 20, where the (X,Y) positions computed and calculated by the processor have been compensated for or adjusted with respect to vertical movements of device 10 that have occurred during navigation.

According to one embodiment, more about which is said below, navigation processor 36 is configured to process the successively acquired discrete image frames using Displacement Sensing and Estimation (DSE) techniques, time-domain processing techniques and/or frequency-domain processing techniques. Note that according to some embodiments navigation processor may be incorporated into external computer or processor 70 instead of into navigation input device 10.

Various aspects of the optical structure of navigation input device 10 permit image frames to be acquired notwithstanding variations in vertical or working distance $z_0$ that may occur as navigation input device 10 is moved atop and across navigation surface 20. One such aspect of the optical structure is the large depth of field of imaging lens 24, which according to various embodiments exceeds or is about 10 mm, about 12 mm, about 14 mm, about 16 mm, about 18 mm, or about 20 mm. The depth of field of device 10 equals $\Delta z_0$, or the acceptable change in working distance $z_0$ that may occur as navigation input device 10 is moved atop and across navigation surface 20 while maintaining at least sufficient or adequate navigation image quality and resolution (see FIG. 4). Yet another such aspect of the optical structure is the focal length of imaging lens 24, which according to various embodiments is about 4 mm, about 6 mm, about 8 mm, about 9 mm, about 10 mm, about 11 mm, about 12 mm, and about 14 mm. Longer focal lengths up to about 50 mm can also be provided, especially when the optical path is folded.

Still another such aspect of the optical structure is the nominal vertical or working distance $z_0$ between imaging lens 24 and navigation surface 20, which in some embodiments ranges between about 20 mm and about 100 mm, or between about 50 mm and about 80 mm. Note that in still other embodiments working distance $z_0$ may assume any value between about 2 mm and about 100 mm, although some difficulty may be expected designing an optical system that provides adequate performance whilst having an imaging lens 24 of large depth of field in combination with a small working distance $z_0$ (e.g., $z_0$=10 mm and $\Delta z_0$=10 mm). In some embodiments, micro-lens arrays may be employed advantageously in the optical system where small working distances are combined with large depths of field.

According to some embodiments, the diameter of aperture 21 ranges between about 0.25 mm and about 4 mm, and in one embodiment is about 1 mm.

Imaging lens 24 may be concave, convex, complex, achromatic, aspherical, spherical, telecentric, or double telecentric.

The foregoing and other attributes of the optical system of navigation input device 10 are configured to cooperate with one another to yield a navigation input device 10 that is configured to provide accurate and reliable output (X,Y) positional data for device 10 in respect of navigation surface 20 despite variations in working distance $z_0$ or in image magnification in different frames acquired by device 10 that occur as navigation input device 10 is moved atop and across navigation surface 20. Such attributes of the optical system of navigation input device 10 may also be configured to cooperate with one another to yield navigation input device 10 where illumination light 18 incident on navigation surface 20 maintains a substantially constant diameter as vertical distance $z_0$ ranges over the depth of field (or $\Delta z_0$) of imaging lens 24, more about which we say below Referring now to FIG. 2, there is shown a block diagram of electronic circuitry 15 of input device 10 according to one embodiment where navigation input device 10 is, by way of example, an optical mouse. Electronic shutter 28 controls the amount of time that light is collected for image frames. Electronic circuitry 15 is configured to generate digital representations of the reflected images, and is further configured to generate movement or (X,Y) positional data based on the digital representations of the reflected images. The (X,Y) positional data are indicative of relative motion between navigation surface 20 and navigation input device 10. Controller 42 coupled to light source 12 turns light source 12 on only during the time that light is being collected for a given image frame. Imaging lens 24 focuses reflected light from such features onto an array of photo detectors or pixels 26, which is part of electronic circuitry 15. Electronic circuitry 15 automatically acquires and tracks any suitable image. When tracking an image, electronic circuitry 15 produces incremental (X,Y) positional data corresponding to each frame or a series of frames acquired in close time or spatial proximity to one another.

One optical navigation technique that may be employed in navigation input device 10 involves optically detecting motion by directly imaging as an array of pixels the various particular optical features visible and detectable upon navigation surface 20. Infrared or other light reflected from navigation surface 20 is focused onto a suitable array of photodetectors or pixels (e.g., a 10×10 array, a 16×16 array, a 10×16 array, a 24×24 array, a 24×30 array, a 20×32 array, a 36×36 array, a 100×100 array, a suitable two-dimensional array, including, but not limited to, a rectangular array, an array that is neither square nor rectangular, an irregularly-shaped array, a polygonal array, an array containing pixels that are not aligned with one another, a one-dimensional non-parallel linear array, an array comprising multiple arrays, and other array types, shapes and sizes).

The responses of individual photo detectors or pixels are digitized to a suitable resolution and stored as frames into corresponding locations within an array of memory. The operation of electronic circuitry 15 is primarily controlled by system controller 38, which is operably coupled to multiplexer 30, A/D converter 32, navigation processor 36, shutter controller 28, and light controller 42. In operation, according to one embodiment, light source 12 emits illumination light 16 that is projected by illumination lens 14 onto navigation surface 20. Light source 12 is controlled by signals from light controller 42. In one embodiment, reflected light 22 from navigation surface 20 is directed by imaging lens 24 onto light sensitive devices contained within detector 26. Such light sensitive devices are typically formed in an array of photo detectors or pixels, which each provide imaging signals that vary in magnitude based upon the intensity of light incident on such light sensitive devices. Electronic shutter 28 is configured to open and close according to the timing of light pulses provided by light source 12 operating under the control of light controller 42.

Based on the level of voltage provided by the individual light detectors, photo detectors, photo diodes or pixels contained within light detector 26, A/D converter 32 generates a digital value of suitable resolution (e.g., one to eight bits) indicative of the voltage level of each imaging signal. The digital values for the sensor pixel array or array of photo detectors in light detector 26 represent a digital image or digital representation of the image navigation surface 20 located beneath input device 10 at the time each image, snapshot or frame is acquired. The digital values are stored as a frame into corresponding locations within an array of memory within navigation processor 36. In one embodiment, each pixel in a frame corresponds to one of the photo detectors in light detector 26.

The overall size of the array of photo detectors or pixels in light detector 26 is preferably large enough to receive an image having several features. In this way, images of such spatial features produce translated patterns of pixel information as input device 10 moves atop and across navigation surface 20. The number of photo detectors in the array and the frame rate at which their contents are digitized and captured cooperate to influence how fast input device 10 can be moved while still reliably and accurately tracking features on and position with respect to navigation surface 20.

In one embodiment, the individual pixels in light detector 26 range between 10 and 20 microns in size, but may also range between about 2 microns and about 30 microns in size, between about 10 microns and about 100 microns in size, or between about 5 microns and about 50 microns in size.

Navigation processor 36 achieves tracking by comparing newly captured sample frames with previously captured reference frames to ascertain the direction and amount of (X,Y) movement in a manner well known to those skilled in the art. Further details according to some embodiments of electronic circuitry 15 shown may be found in U.S. Pat. No. 6,797,937 to Norskog et al. entitled "System and Method for Reducing Power Consumption in an Optical Screen Pointing Device," the entirety of which is hereby incorporated by reference herein.

Navigation input device 10 may be a mouse, an optical mouse, a pen-shaped optical mouse, a stylus, a writing instrument, a pen, a measurement device, an alignment device, a machine alignment device, or any other suitable stationary, portable, semi-portable or hand-held navigation input device. Navigation input device 10 may also form a portion of a system comprising device 10 and a computer, a processor, a PDA, a mobile telephone, a smart phone, an eBook, a display, a touch screen, a touch pad, an active backplane, an industrial control, an appliance, or any other suitable device.

Input device 10 may comprise a sensor configured to detect whether the bottom of device 10 is in contact with navigation surface 20. A communication module may also be incorporated into input device 10 to wirelessly or otherwise link navigation input device 10 to computer or processor 70, which may or may not be a device external to device 10. As discussed in further detail below, a beam splitter arrangement may also be employed in the optical system of navigation input device 10.

Figure 3:
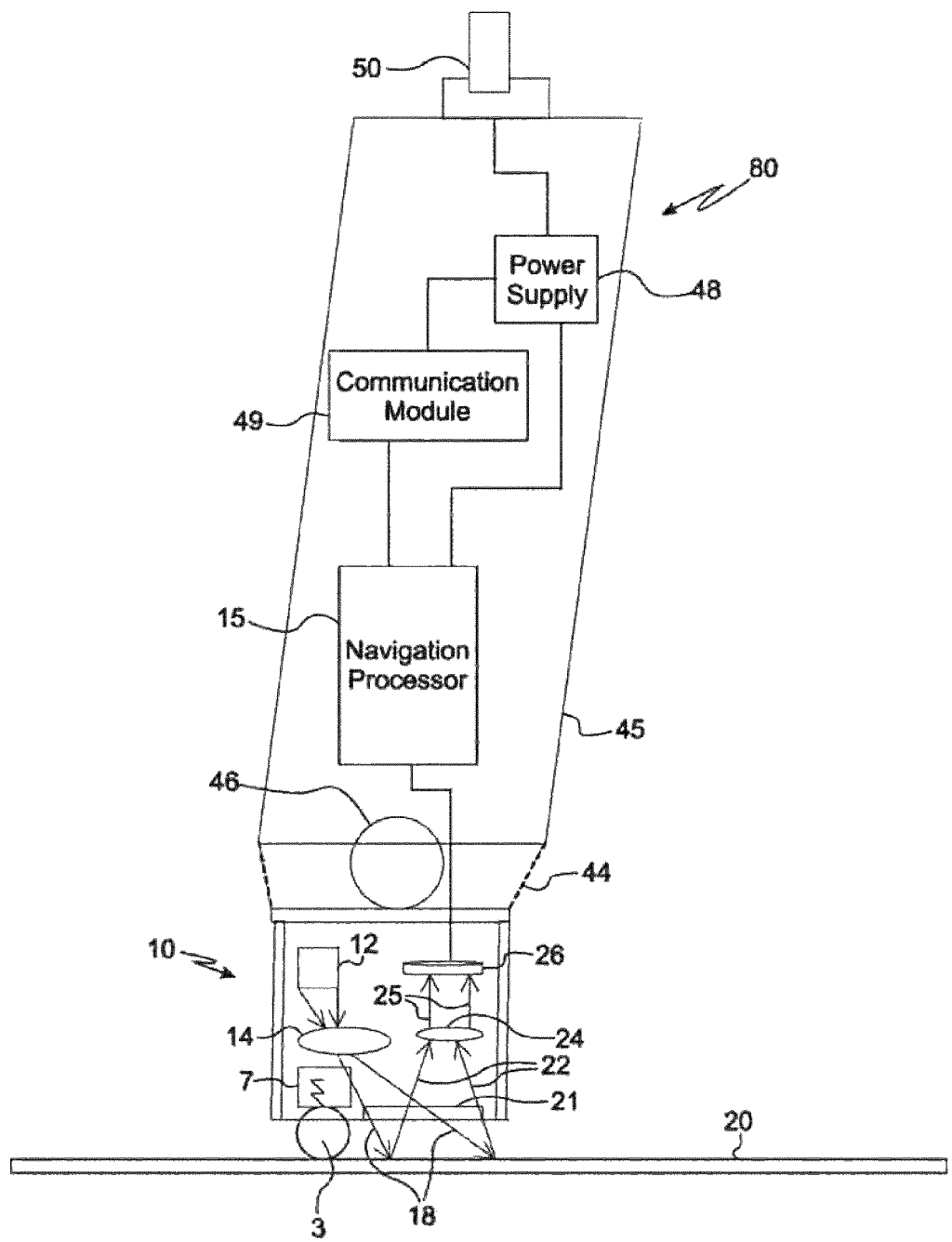
FIG. 3 shows a cross-sectional view and schematic block diagram according to one embodiment of a writing instrument 80.

Referring now to FIG. 3, there is shown one embodiment of navigation input device 10 configured as a writing instrument or pen. As shown in FIG. 3, writing instrument or pen 80 comprises navigation input device 10 attached to a lower portion of pen 80, which is configured to travel atop and across navigation surface 20. In one embodiment, navigation input device 10 of pen 80 is an opto-electronic DSE pen head. Rolling ball 3 is spring-loaded by means of spring 7 and is configured to engage and roll across navigation surface 20, which may be a sheet of paper, a screen, a display, a touch pad or touch screen, or any other suitable navigation surface 20. Rolling ball 3 may also be configured to actuate a switch or sensor to indicate whether ball 3 is in contact with navigation surface 20. According to one embodiment, light source 12, illumination lens 14, aperture 21, imaging lens 24 and light detector 26 operate substantially in the manner described above in connection with FIG. 1 or 2.

Electronic circuitry 15 receives analog image signals from light detector 26 and processes same to provide output (X,Y) positional data as pen 80 is moved across and atop navigation surface 20. Optional ink reservoir 7 permits pen 80 to operate as a writing instrument on writing media, sheet of paper or other suitable navigation surface 20 simultaneous with pen 80's functionality as a pointing or (X,Y) tracking device. In conjunction with flexible pen body 45 to input device 10 member 44, head-to-pen-body connector 46 permits navigation input device 10 to maintain substantial perpendicularity with respect to writing medium or navigation surface 20. Communication module 49 transmits (X,Y) positional data calculated by navigation processor 36 contained within circuitry 15 to external computer or processor 80. Alternatively, image signals provided by light detector 26 or digital signals corresponding thereto provided by A/D converter 34 may be transmitted or communicated to external computer or processor 70, where (X,Y) positional data may be further processed by a processor contained within or operably connected to computer or processor 70. Power supply 48 provides power to the various electrical and electronic components disposed within pen 80. In one embodiment, on-off switch is located atop pen 80. In a manner similar to that described above in connection with FIGS. 1 and 2, pen 80 is configured to navigate accurately and reliably atop and across writing media or other navigation surface 20 despite changes in vertical distance $z_0$ occurring during navigation. Pen 80 may also include some features of the devices disclosed in U.S. Pat. No. 6,151, 015 to Baydal et al. entitled "Pen Like Computer Pointing Device," the entirety of which is hereby incorporated by reference herein.

Figure 4:
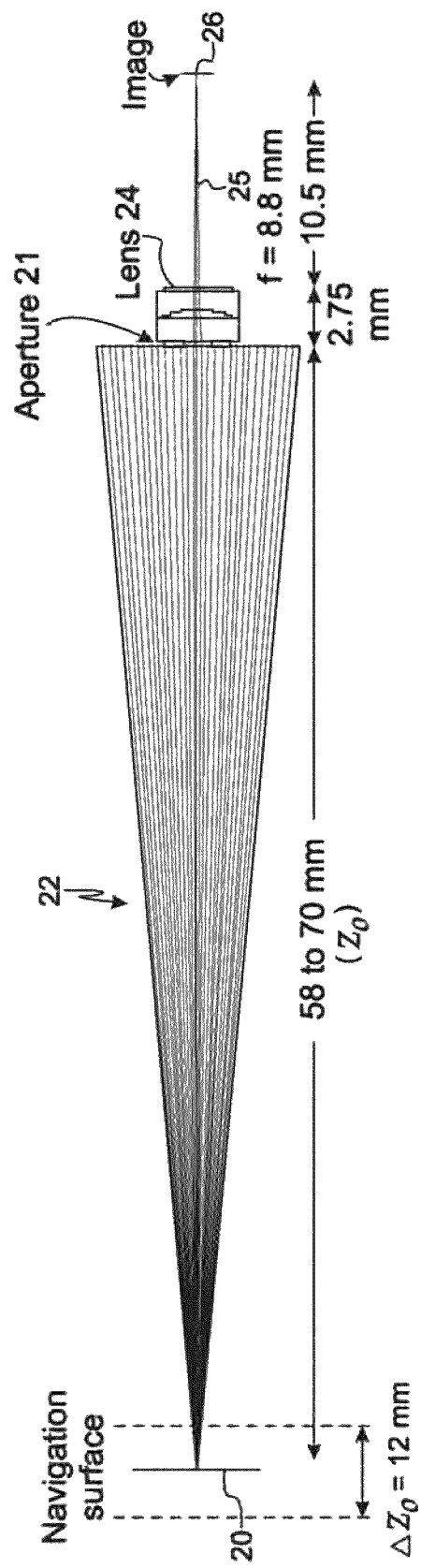
FIG. 4 shows one embodiment of an optical imaging portion of navigation input device 10.

Referring now to FIG. 4, there is shown one embodiment of a portion of an optical system of navigation input device 10 comprising imaging lens 24 and light detector 26. As shown, imaging lens 24 is located at working distance or height $z_0$ that may range between 58 and 70 mm above navigation surface 20 while maintaining sufficient focus and resolution in images obtained of navigation surface 20. Successfully implementing DSE or other suitable processing techniques in navigation input device 10 requires that the optical design provide acceptable imaging resolution and focus over the depth of field or $\Delta z_0$. In most two-dimensional navigation systems employed in computer pointing devices of the prior art, most notably optical mice, the depth of field or $\Delta z_0$ is typically on order of a few millimeters and almost never even approaches 10 mm. In actual operation, contact between such prior art devices and navigation surfaces 20 over which they are moved must be maintained to permit continuous tracking of (X,Y) positions; a brief lift of such devices vertically off navigation surface 20 may result in a loss of navigation. To provide a practical implementation of a DSE or other type of positional data tracking system, the depth of field or $\Delta z_0$ must therefore be large enough to enable continuous tracking of the (X,Y) location of navigation input device 10 notwithstanding changes in $z_0$ that fall within the depth of field.

The depth of field of any optical system is a function of several design parameters such as the focal length of the lens, the entrance aperture, optical magnification, and the size of light defector 26, to name a few. It has been discovered that appropriate combinations of suitable optical parameters in conjunction with DSE or other suitable processing techniques can yield a device 10 having a depth of field that is greater than or equal to about 10 mm. An example of an optical portion of such a device 10 is shown in FIG. 4, where achromatic doublet imaging lens 24 has a depth field of 12 mm. In the example of FIG. 4, imaging lens 24 is optimized to have minimum spherical aberration at the near-infrared wavelength (e.g., about 850 nm).

Navigation input device 10 may be configured to work at any suitable wavelength or over a suitable range of wavelengths (for example, white light); the selection of an 850 nm wavelength is just an example. Light source 12 may be a laser, a light emitting diode (LED), an infrared LED, a near-infrared LED, a high-efficiency infrared or near-infrared LED, a VCSEL, an LED or laser source emitting light in the visible spectrum, a white light source, a UV light source, or any other suitable source of illuminating light.

In the embodiment illustrated in FIG. 4, imaging lens 24 is employed in conjunction with an input aperture 21 of about 1 mm diameter, and light detector 26 having individual pixel sizes of about 14 microns. The depth of field of imaging lens 24 equals or exceeds about 12 mm when the object to be imaged on navigation surface 20 is located at a height $z_0$ of about 64 mm from imaging lens 24. In other words, images of the features presented by navigation surface 20 can be formed with acceptable sharpness when distance $z_0$ ranges between about 58 mm and about 70 mm.

Figure 5:
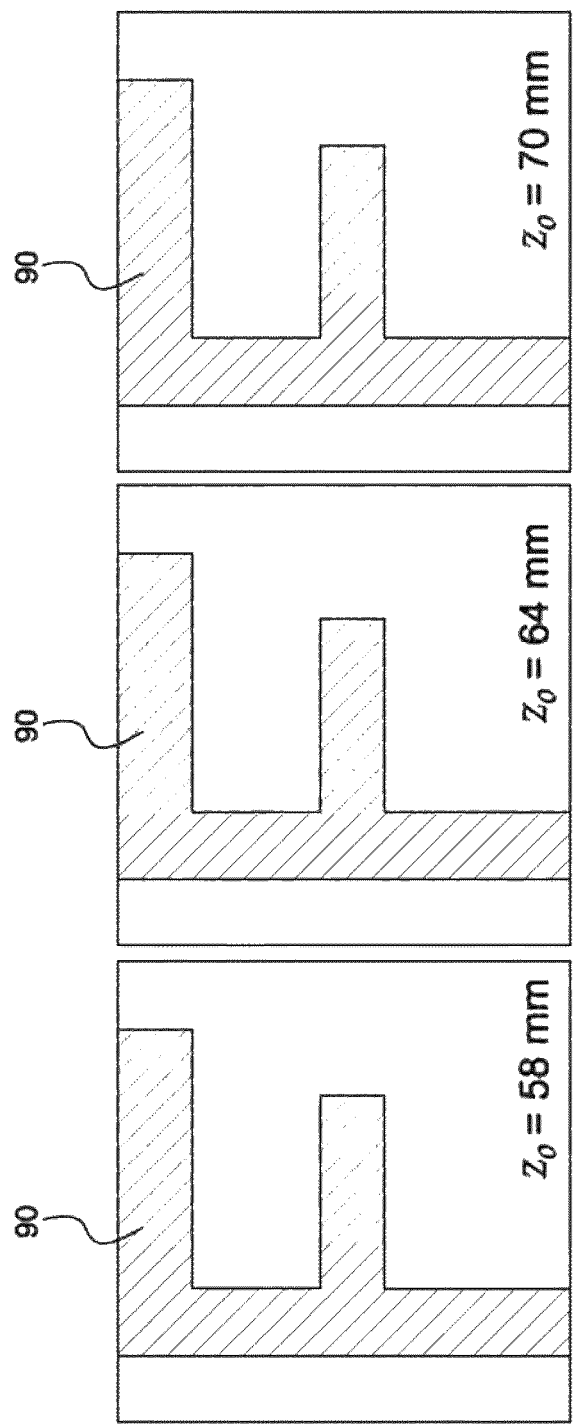
FIG. 5 shows images obtained at different heights $z_0$ using the optical imaging portion of FIG. 4.

Referring now to FIG. 5, there are shown three different images or frames of the letter "F" located on navigation surface 20 obtained and acquired when the working distance $z_0$ between imaging lens 24 and navigation surface 20 is 58 mm, 64 mm, and 70 mm. Note that the acquired images in FIG. 5 have been compensated for changes in magnification occurring as a result of changes in working distance $z_0$. The processed images of FIG. 5 are substantially the same despite a 17% maximum difference in magnification occurring between the 58 mm and 70 mm frames. Corrections to such images can therefore be made using DSE or other suitable processing techniques to remove changes in image magnification, thereby eliminating or reducing errors in (X,Y) navigation arising from changes in $z_0$. Changes less than about 25% in the sizes or magnifications of images or frames resulting from changes in $z_0$ that fall within the depth of field are also contemplated.

Providing images of acceptable resolution and sharpness over different distances $z_0$ is required for the successful implementation of DSE and other suitable processing techniques. In most practical imaging systems employing the teachings presented herein, the size or magnification of the acquired images or frames changes as the working distance $z_0$ between the object to be imaged and imaging lens 24 changes. In the context of suitable processing techniques, however, deterministic changes in image size resulting from variations in $z_0$ can be differentiated from other changes occurring in successively acquired images that result from lateral or (X,Y) positional changes of device 10 with respect to navigation surface 20. One such method that can be implemented in a DSE or other suitable algorithm is to illuminate navigation surface 20 using illumination light that is of substantially constant diameter upon navigation surface 20, and that is relatively or substantially independent of changes in working distance $z_0$. The relatively or substantially constant diameter of the resulting spot of light shining on navigation surface 20 is then employed as a reference during DSE or other suitable processing to correct changes in successively acquired frames or images that arise from changes in working distance $z_0$. In addition, DSE and other suitable processing techniques applied to such images or frames can be extended to estimate or calculate working distance $z_0$. Some applications where estimating or calculating working distance $z_0$ are useful include, but are not limited to, emulating brush width in calligraphy or hand-writing according to, by way of example, the amount or degree of downward pressure exerted by a user on pen, writing instrument or stylus, and forced-feedback gaming systems.

According to one embodiment, changes in the size or magnification of successively acquired images of frames can be minimized by using an object-space telecentric lens or a double telecentric lens for imaging lens 24. In telecentric lenses, the size and shape of the image is substantially independent of object distance $z_0$ over the depth of field. In such an embodiment, the need for an algorithm to correct changes in image size or magnification can be eliminated or minimized. Use of a telecentric lens for imaging lens 24, however, may present certain design constrains and limitations for the optical imaging system involving trade-offs between competing design objectives. Note that a telecentric design for imaging lens 24 is not a requirement to implement navigation input device 10 disclosed herein.

Upon having read, reviewed and understood the present specification and drawings, those skilled in the art will understand that many other lens and optical configurations may be employed without departing from the scope of the invention. For example, multiple or single lenses, achromatic lenses, concave lenses, convex lenses, complex lenses, achromatic lenses, aspherical lenses, spherical lenses, or double telecentric lenses, properly and suitably implemented, may be employed in various embodiments.

In the illumination portion of the optical system of device 10, different optical arrangements and configurations are contemplated. A basic requirement is that the illumination spot on navigation surface 20 be and remain within the field of view of the imaging system. According to one embodiment, and if a telecentric lens is not employed, it is preferred that the diameter of the illumination spot on navigation surface 20 remain relatively or substantially constant over a range of distances $z_0$ within the depth of field. One such embodiment of an illumination system employs a beam splitter in the optical path of the imaging system to form a compact and uniform illumination beam. The location of the beam splitter and the optics of the illumination portion of the optical system are then configured to provide illumination light that forms a spot of substantially constant diameter onto navigation surface 20 despite changes in working distance $z_0$ that occur over the depth of field or $\Delta z_0$.

Figure 6:
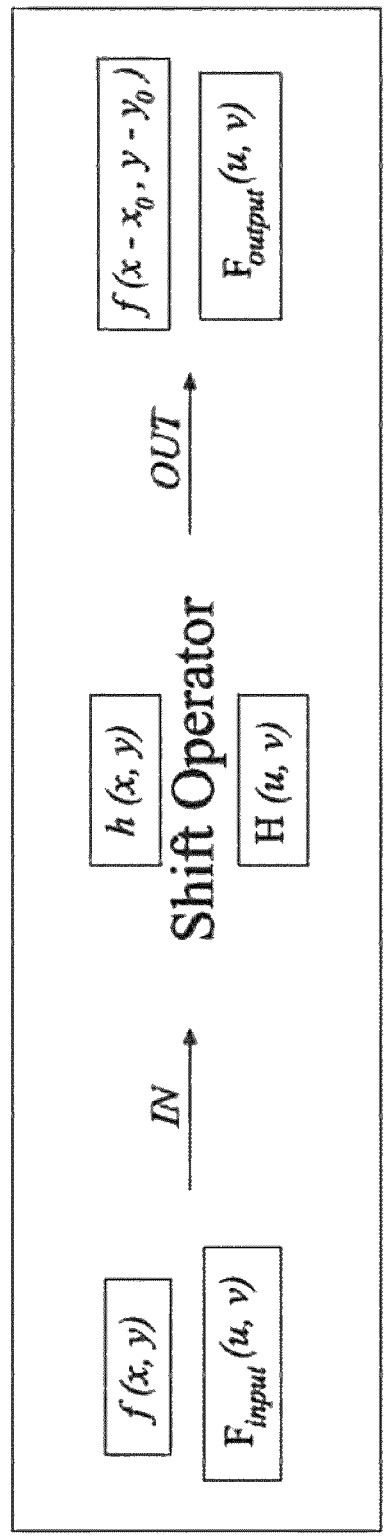
FIG. 6 shows a transform that may be employed in DSE processing techniques used in some embodiments of navigation input device 10.
Figure 7:
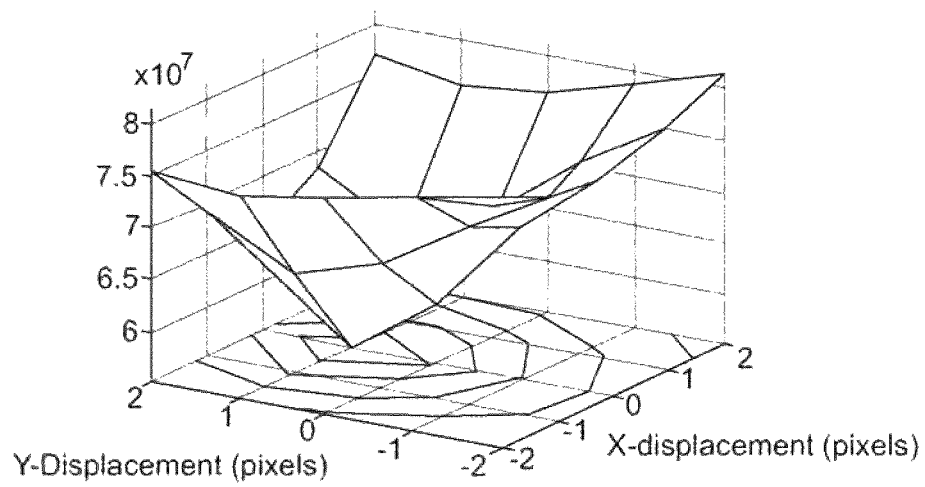
FIGS. 7 and 8 show calculated correlation surfaces calculated according to one embodiment of DSE processing techniques for use in some embodiments of navigation input device 10.
Figure 8:
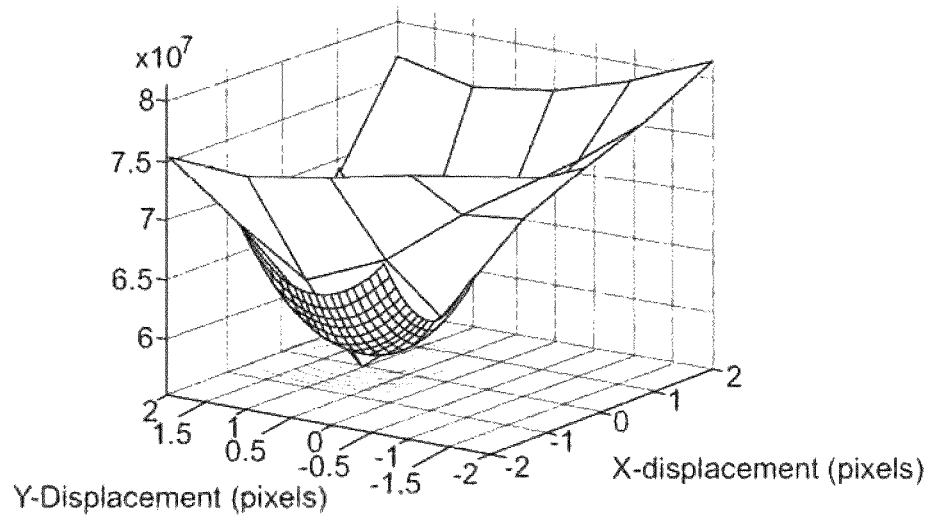

Referring now to FIGS. 6 through 8, we discuss some embodiments of DSE processing techniques that may be employed in conjunction with the optical and electronic features and aspects described above to provide a hand-held navigation device 10, where device 10 is capable of operating over a relatively wide range of working distances $z_0$ while providing accurate and reliable (X,Y) positional information as the user navigates across and atop navigation surface 20.

Certain aspects of DSE theory define what constitutes a displacement of a rigid object. We describe the displacement of such an object as a "shift operator," which is a Linear Shift-Invariant System (LSIS), as shown in FIG. 6. The shift operator imposes a constant group shift, thereby exhibiting a linear phase response, as illustrated by Eq. (1), where phase shifts are seen to vary linearly with frequency.

$$H(u,v) = \frac{F_{output}(u,v)}{F_{input}(u,v)} = e^{i2\pi(ux_0+vy_0)} \quad \text{eq. (1)}$$

FIG. 6 shows a spatial displacement of an object modeled as a linear shift-invariant operator. The shift operator h(x, y) represents a Linear Shift-Invariant System (LSIS). In this embodiment, the shift operator has caused the object to translate along the spatial vector $(x_0,y_0)$. In frequency space, the operator, represented as H(u,v) in eq. (1), causes a phase-shift, which may be expressed as a multiplication by the complex vector $e^{i2\pi(ux_0+vy_0)}$.

Implementations of DSE algorithms generally fall into two groups: (1) algorithms based on statistical analyses of images, such as correlations of a reference (or non-displaced) frame with respect to a comparison (or displaced) frame; (2) algorithms based on transforms, such as Fourier transforms of individual frames. Algorithms of the latter type, such as PCM (Phase Correlation Method) and PDD (Phase delay detection), take advantage of the translation property of Fourier transforms, as expressed in eq. (1).

One embodiment of a correlation-based DSE algorithm involves multiple 2-dimensional correlations between the two images. One such correlation function is represented by Eq. (2):

$$C_{i,j}^k = \sum_{m=1}^{M}\sum_{n=1}^{N} |r_{m,n} - c_{m-i,n-j}|^k \quad \text{eq. (2)}$$

Equation (2) is a non-zero-mean difference-detection function, where $r_{m,n}(c_{m,n})$ is the digitized value of the reference (comparison) image at pixel {m,n} and i,j∈R represent the shift of the comparison frame relative to the reference frame, measured in units of pixels. Typically, k∈N, although in principle any k∈R≧1. In experimental implementations of an N-Cubed algorithm, k is typically set to 2, which usually results in an intuitive formulation that computes the sum of the squared pixel differences between the reference frame and the comparison frame. Such an implementation provides a closed analytical solution for displacement estimation which is both efficient and elegant. However, k can be of any other value, resulting in different forms or types of iterative solutions.

FIGS. 7 and 8 show typical $2^{nd}$ order k=2 implementations of one embodiment of a correlation-based DSE algorithm. Initially, two successive images are acquired in sequence (assuming that the displacement between the frames or images is within a ±2 pixel boundary), where only lateral displacement differences occur between the frames or images. The first image is called a reference frame, and the second image is called a comparison frame. Next, shifted correlations (or the sum of the squared differences of all pixels) are computed using a 5×5 grid (which corresponds to ±2 pixels). As shown in FIG. 7, a raw pixel-level minimum value is obtained by comparing all correlation values. In the next step, a mathematical fit around the obtained raw minimum value is calculated, as shown in FIG. 8, where an accurate sub-pixel-level minimum value or calculated interpolated minimum corresponding to a final measured displacement (ΔX,ΔY) is obtained using the fitting function. Inherent in the fitted minimum value is the assumption that an actual lateral displacement (ΔX,ΔY) has occurred between the reference frame and the comparison frame. The DSE process is then continued as the comparison frame becomes a new reference frame, and a new frame is acquired as the comparison frame. In such a manner the process of DSE is continued as the user navigates across and atop navigation surface 20.

As noted above, some embodiments of the DSE algorithm may include steps which take into account and adjust for changes in image magnification that occur from frame to frame, or may include steps that that correct for changes in successively acquired frames or images arising from changes in distance $z_0$. In addition, DSE or other suitable processing techniques applied to such images or frames may be extended to estimate or calculate approximate working distances $z_0$ or changes in distance $z_0$ that occur from frame to frame.

The DSE processing techniques, methods and algorithms described above are not intended to be exhaustive or complete in all possible aspects according to all embodiments. Instead, they are intended to serve as examples of how DSE processing techniques, methods and algorithms may be employed successfully in conjunction with the various optical features and attributes presented herein. Further information regarding DSE processing techniques, methods and algorithms that may be adapted for use in some embodiments may be found in the following printed publication "Displacement sensing and estimation theory and applications" to Gao et al., Appl. Phys. A 80, 1265-1278 (2005), which is hereby incorporated by reference herein in its entirety.

Note that many other suitable data processing techniques besides DSE may be employed in processor 36, including, but not limited to, time-domain and/or frequency-domain digital filtering or data processing techniques, adaptive digital filtering or data processing techniques, digital noise filtering or data processing techniques, and two- and three-dimensional digital filtering or data processing techniques.

Figure 9:
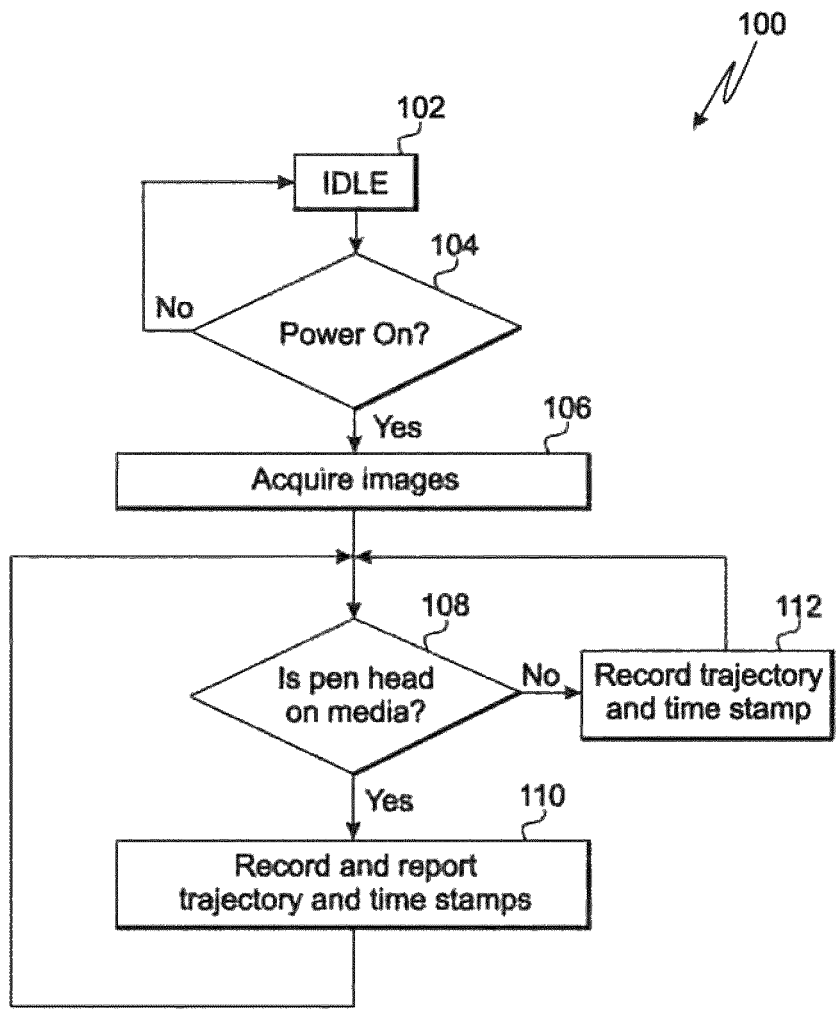
FIG. 9 shows one embodiment of a method for navigating across and atop a navigation surface using writing instrument 80.

Referring now to FIG. 9 there is shown one embodiment of method 100 for navigating with a stylus, pen or writing instrument across and atop navigation surface 20. At step 102 device 10 is idle. When power to device 10 is turned on at step 104, successive frames or images are acquired at step 106. At step 108 it is determined whether the stylus, pen or writing instrument is in contact with the underlying writing medium 20. If the stylus, pen or writing instrument is not in contact with the underlying writing medium 20, the trajectory of the stylus, pen or writing instrument is recorded and time stamped at step 112. If the stylus, pen or writing instrument is in contact with the underlying writing medium 20, the trajectory of the stylus, pen or writing instrument is reported, recorded and time stamped at step 110. The navigation process continues as the user continues to write or otherwise navigate across the writing medium or navigation surface 20.

While the primary use of device 10 is believed likely to be in the context of desktop computers and battery-operated portable electronic devices, the device also finds application in the context of larger and smaller devices, including, for example, stationary devices, industrial control panels, household appliances, measurement devices, machine alignment devices and the like. The device may further form a portion of a system comprising the hand-held device and a computer, a processor, a PDA, a mobile telephone, a smart phone, an eBook, a display, a touch screen, a touch pad, an industrial control, or an appliance to which navigation input device 10 is operably connected to, or in conjunction with which navigation input device 10 is configured to operate.

While many embodiments are believed most likely to be configured for manipulation by a user's fingers or hand, some embodiments may also be configured for manipulation by other mechanisms or body parts. For example, the device may be located on or in the hand rest of a keyboard and engaged by a heel of a user's hand. Moreover, it is also contemplated that navigation surface 20 be moved in respect of navigation input device 10 (as opposed to the other way round). It is further contemplated that navigation input device 10 be operated in any of a number of different spatial or positional physical positions (e.g., facing downwardly, upwardly, sideways, or otherwise).

Note further that included within the scope of the present invention are methods of making and having made the various components, devices, systems and methods described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A navigation input device, comprising:
   (a) a light source configured to project an illumination light downwardly therefrom;
   (b) an aperture located beneath an illumination lens and configured to permit at least a portion of the illumination light to pass therethrough for incidence upon a navigation surface located below the aperture, wherein a diameter of the aperture ranges between about 0.25 mm and about 4 mm;
   (d) an imaging lens having a depth of field of about 12 mm, about 14 mm, about 16 mm, about 18 mm, or about 20 mm and a focal length ranging between about 6 mm and about 50 mm, the imaging lens being at least one of achromatic, telecentric, or double telecentric and being positioned and configured to receive at least a portion of upwardly reflected light formed by at least a portion of the illumination light being reflected from the navigation surface towards the imaging lens, the imaging lens being located a working distance above the navigation surface, the working distance ranging from between about 50 mm and about 80 mm, wherein the illumination light incident on the navigation surface has a substantially constant diameter as the working distance ranges over the depth of field;
   (e) a light detector comprising a sensor pixel array configured to receive at least a portion of the upwardly reflected light passing through the imaging lens and to convert such portion of the reflected light into imaging signals corresponding to individual pixels in the sensor pixel array, and
   (f) a navigation processor configured to receive and process the imaging signals corresponding to successively acquired image frames of the sensor pixel array such that output data corresponding to (X,Y) positions of the device with respect to the navigation surface are provided thereby, and further such that the output data include compensation or adjustment for changes in the working distance caused by the device being lifted or lowered in respect of the navigation surface, the changes in the working distance falling within the depth of field of the imaging lens.

2. The navigation input device of claim 1, wherein the device is configured to move in respect of the navigation surface.

3. The navigation input device of claim 1, wherein the illumination lens located between the light source and the aperture.

4. The navigation input device of claim 3, wherein the device is configured such that at least a portion of the illumination light passes downwardly through the illumination lens.

5. The navigation input device of claim 1, further comprising a beam splitter located in an optical path of the device.

6. The navigation input device of claim 1, wherein the device is configured to be hand-held by a user.

7. The navigation input device of claim 1, wherein the device is configured for movement and navigation atop and across the navigation surface.

8. The navigation input device of claim 1, wherein the navigation processor is configured to process the successively acquired image frames using time domain processing techniques.

9. The navigation input device of claim 1, wherein the navigation processor is configured to process the successively acquired image frames using frequency domain processing techniques.

10. The navigation input device of claim 1, wherein the navigation processor is configured to process the successively acquired image frames using Displacement Sensing and Estimation (DSE) techniques.

11. The navigation input device of claim 1, wherein the device is an optical mouse, a pen-shaped optical mouse, a stylus, a writing instrument, a pen, a measurement device, an alignment device, or a machine alignment device.

12. The navigation input device of claim 1, wherein differences in image magnification of successively acquired frames resulting from changes in the working distance are less than about 25%.

13. The navigation input device of claim 1, wherein individual pixels in the sensor array range between about 10 microns and about 20 microns in size, between about 2 microns and about 30 microns in size, between about 10 microns and about 100 microns in size, or between about 5 microns and about 50 microns in size.

14. The navigation input device of claim 1, wherein the pixel sensor array comprises at least 100 pixels or at least 1,000 pixels.

15. The navigation input device of claim 1, wherein the light source is a laser, a light emitting diode (LED), an infrared LED, a near-infrared LED, a high-efficiency infrared or near-infrared LED, a VCSEL, an LED or laser source emitting light in the visible spectrum, a white light source, or a UV light source.

16. The navigation input device of claim 1, wherein the device forms a portion of a system comprising the device and a computer, a processor, a PDA, a mobile telephone, a smart phone, an eBook, a display, a touch screen, a touch pad, an active backplane, an industrial control, or an appliance.

17. A method of navigating across a navigation surface with a navigation input device, comprising:
(a) illuminating the navigation surface with at least a portion of illumination light generated by a light source;
(b) sensing reflected light resulting from at least a portion the illumination light being reflected from the navigation surface and passing through an imaging lens, the imaging lens having a depth of field of about 12 mm, about 14 mm, about 16 mm, about 18 mm, or about 20 mm, the imaging lens being at least one of achromatic, telecentric, or double telecentric, and further being located a working distance above the navigation surface, the working distance ranging from between about 50 mm and about 80 mm, wherein the illumination light incident on the navigation surface has a substantially constant diameter as the working distance ranges over the depth of field, the sensed reflected light being employed to generate imaging signals;
(c) generating, from the imaging signals, successive image frames corresponding to images of the reflected light as the device and the navigation surface move in respect of one another, and
(d) processing the successive image frames such that output data corresponding to (X,Y) positions of the device with respect to the navigation surface are provided thereby, and further such that the output data include compensation or adjustment for changes in the working distance caused by the device being lifted or lowered in respect of the navigation surface, the changes in the working distance falling within the depth of field of the imaging lens.

18. The method of claim 17, further comprising passing the illumination light through an illumination lens located between the light source and the aperture.

19. The method of claim 17, further comprising processing the successively acquired image frames, in the processor, using Displacement Sensing and Estimation (DSE) processing techniques.

20. The method of claim 17, further comprising processing the successively acquired image frames, in the processor, using time-domain processing techniques.

21. The method of claim 17, further comprising processing the successively acquired image frames, in the processor, using frequency-domain processing techniques.

22. The method of claim 17, wherein, the device moves across the navigation surface.

23. The method of claim 17, wherein the navigation surface moves across the navigation input device.

24. The method of claim 17, further comprising passing the illumination light through the imaging lens.

25. The method of claim 17, wherein the device is an optical mouse, a pen-shaped optical mouse, a stylus, a writing instrument, a pen, a measurement device, an alignment device, or a machine alignment device.

26. The method of claim 17, wherein the device forms a portion of a system comprising the device and a computer, a processor, a PDA, a mobile telephone, a smart phone, an eBook, a display, a touch screen, a touch pad, an active backplane, an industrial control, or an appliance.

* * * * *